United States Patent [19]

Kitano et al.

[11] Patent Number: 5,733,539
[45] Date of Patent: Mar. 31, 1998

[54] BAIT FOR FISHES AND SHELLFISHES

[75] Inventors: Hisao Kitano, Sakai; Masahiro Matsuda, Kakogawa; Yasushi Ifuku, Wakayama; Hisao Maeda, Osaka; Yoshifumi Matsuda, Wakayama, all of Japan

[73] Assignee: Research Institute for Production Development, Kyoto, Japan

[21] Appl. No.: 817,645

[22] PCT Filed: Aug. 23, 1996

[86] PCT No.: PCT/JP96/02374

§ 371 Date: Jul. 18, 1997

§ 102(e) Date: Jul. 18, 1997

[87] PCT Pub. No.: WO97/08959

PCT Pub. Date: Mar. 13, 1997

[30] Foreign Application Priority Data

Sep. 1, 1995 [JP] Japan ................................. 7-248441
Jul. 24, 1996 [JP] Japan ................................. 8-214300

[51] Int. Cl.$^6$ .................. A01N 25/00; A01N 63/02;
A01N 63/04; A01N 65/00; A23K 1/00;
A23K 1/14; A23K 1/16; A23K 1/18

[52] U.S. Cl. ................ 424/84; 424/405; 424/407;
424/409; 424/410; 424/484; 424/115; 424/195.1;
426/1; 426/805; 514/400; 514/419; 514/423;
514/553; 514/556; 514/557; 514/561; 514/562;
514/563; 514/564; 514/565; 514/566; 514/567;
514/568; 514/572; 514/574; 514/575; 514/576;
514/578; 514/665

[58] Field of Search ................ 424/84, 405, 407,
424/409, 410, 484, 115, 195.1; 426/1, 805;
514/400, 419, 423, 553, 556–557, 561–568,
572, 574, 575, 576, 578, 665

[56] References Cited

U.S. PATENT DOCUMENTS 4,973,559  11/1990  Dexter et al. ......................... 435/252

FOREIGN PATENT DOCUMENTS 53-127189  11/1978  Japan.
60-168348  8/1985  Japan.

*Primary Examiner*—John Pak
*Attorney, Agent, or Firm*—Nikaido, Marmelstein, Murray & Oram LLP

[57] ABSTRACT

The invention discloses a bait for fishes and shellfishes characterized in that the bait comprises a matrix material containing a microorganically fermented product of a plant residue obtained by separating from a plant at least one liquid selected from the group consisting of vegetable juice, fruit juice, plant essential oil, juice extracted from a processed plant product, plant milk and mixtures thereof, or disintegrated product of said microorganically fermented product, wherein the matrix material has incorporated therein (A) an amino acid having 2 or 3 carbon atoms, and (B) amino acid having at least 4 carbon atoms in an (A)/(B) molar ratio of 1:1 to 40:1.

4 Claims, No Drawings

BAIT FOR FISHES AND SHELLFISHES

This application is a 371 of PCT/JP96/02374, filed on Aug. 23, 1996.

TECHNICAL FIELD

The present invention relates to baits useful for fishes and shellfishes, manufactured from plant wastes.

The term "fishes and shellfishes" as used herein refers to fishes, shellfishes (conches, bivalves, cuttlefishes and octopuses) and crustaceans of the Arthropoda (lobsters, shrimps and crabs) living in seawater, brackish water or fresh water. The invention provides baits for use in fisheries for breeding, raising or cultivating such fishes and shellfishes.

BACKGROUND ART

Although the research on microorganically fermented materials for use as baits for fishes and shellfishes was conducted on a considerably large scale to obtain petroleum proteins, such materials were not placed into actual use in Japan because of the presence of carcinogenic substances therein. On the other hand, the squeezing cakes of plant seeds for oil have a high protein content, but contain polysaccharide which are difficult to digest and phytocid which is a nonvolatile poisonous component, and are not useful without some conversion before use in assorted baits. Although the solid residue resulting from alcoholic fermentation is a useful protein source, the residue has problems in respect of the protein content and the balancing of amino acids and palatability to the taste of fishes and shellfishes. Torula yeast and chlorella, although in actual use, are not promising as they are sufficient for feeding effect and digestion efficiency, and are merely used as components of assorted feeds, baits for special fishes or shellfishes, or as ingredients of mixtures for fishing baits in some cases. The Torula yeast is prepared by causing *Candida utilis* to act on sulfite pulp mill waste liquor. The pulp yeast has an especially strong cell wall and made efficiently digestible by heating, drying and milling, or by being subjected to an extraction procedure for removing ribonucleic acid to prepare inosinic acid (used as a seasoning). When the pulp yeast is extracted, the cell of the yeast is weakened. While the product of chlorella can be improved in digestibility when treated with a cellulase, the cellulase commercially available encounters difficulty in completely removing the cell wall.

DISCLOSURE OF THE INVENTION

In view of the problems involved in the background art, we prepared baits for fishes and shellfishes using various microorganically fermented products obtained by preparatory research and conducted experiments and further research for evaluating the baits for fishes and shellfishes in comparison with fresh baits, frozen baits, fish meals or commercial assorted baits in order to provide baits which are useful for fishes and shellfishes as our technical object.

Our basic studies revealed that fishes in water first make a sharp response to the amino acid adhered to model baits and that the amino acid presumably acts not as a gustatory substance but first as an olfactory substance.

With the fishes, the nasal cavity providing the olfactory sense is not clearly in direct communication with the oral cavity, and the olfactory nerve acts in a process wherein water is taken in via the anterior nasal cavity in front of the eye and discharged through the posterior nasal cavity. If the anterior nasal cavity is closed, no olfactory sense is excited in general. With some fishes, the lateral line of the fish body seems to be associated with the sense of smell, but it appears that this part has no active function other than the sense of vibration. On the other hand, the sense of taste is aroused when the food approaches or comes into contact with taste buds distributed around the mouth, in the oral cavity, pharynx and branchial cavity. As to the transmission of the sense of smell, the olfactory substance appears to reach olfactory cells more rapidly than is expected owing to the diffusion of the substance in water. Presently we are conducting research also on this mechanism. Further the olfactory organ of shellfishes is located at the water inlet portion of the branchial cavity, while arthropods have a pair of olfactory palpus at the base of antennule. These basic findings have led us to carry out further technical research to accomplish the present invention. More specifically stated, the present invention provides a bait for fishes and shellfishes which comprises a matrix material containing a microorganically fermented product of a plant residue resulting from squeezing or its disintegrated product, the matrix material having incorporated therein a lower amino acid (A) having 2 or 3 carbon atoms, and a higher amino acid (B) having at least 4 carbon atoms in an A/B molar ratio of 1 to 40.

The present invention will be described below in greater detail.

The plant residue is a residue obtained by separating from a plant at least one liquid selected from the group consisting of a vegetable juice, fruit juice, plant essential oil, juice extracted from a processed plant product, plant milk and a mixture of such liquids. The plant residue is substantially free from alkaloids other than methylated purine derivatives, and toxic glycosides, and is preferably one obtained from a plant substantially free from these substances.

The lower amino acid (A) having 2 or 3 carbon atoms is at least one amino acid selected from the group consisting of glycine, α-alanine, β-alanine, sarcosine, serine, cysteine and taurine. The higher amino acid (B) having at least 4 carbon atoms is at least one amino acid selected from the group consisting of essential amino acids and nonprotein amino acids.

Typical of the plant are those of the families Cruciferae, Rosaceae, Salanaceae, Leguminosae, Rutaceae, Vitaceae, Theaceae, Rubjaceae, Bromeliaceae and Gramineae. The plants belonging to the same family or analogous families generally contain alkaloids of the same type, whereas purine derivatives are exceptional. They are contained, for example, in the genus Coffea of the family Rubiaceae (coffee), Thea sinensis of the family Theaceae (tea) and the families Sapindaceae (guarana), Aquifoliaceae (mate) and Streculiaceae (cacao, cola). Although low in content, purine derivatives are further present in a wide variety of plants of the families Annonaceae, Nyctaginaceae, Geraniaceae and Apocyanaceae.

Methylated purine derivatives such as caffeine, theobromine and theophylline are called pseudo-alkaloids and have long been distinguished from usual alkaloids.

Compounds having a purine nucleus, such as hypoxanthine, xanthine, guanine, adenine, 1-methylguanine, 6-methylaminopurine, 6-dimethylaminopurine, 2-methyladenine and 2-methylamino-6-hydroxypurine are all nucleic acid bases, and greatly differ in the significance of presence from other common alkaloids having toxicity and widely occurring in bacteria, yeasts and RNAs. From the viewpoint of phytochemistry, the compounds included in purines are not what are termed secondary metabolites such as nonvolatile phytocids, and such compounds can be contained in the plant residues referred to in the present invention without any objection. Toxic glycosides are nonvolatile phytoncids other than the terpene compounds of plants. The term "toxic glycoside" as used herein refers to a glycoside whose toxicity is difficult to eliminate even by heating or hydrolysis. Examples of toxic glycosides are tanghinin, cerberin, strophanthin, digitoxigenin, digitoxin, glucofranglin, aloin, ptaquiloside, and saponin.

Although it is desired to exclude to the greatest possible extent the plants or plant residues containing these compounds from the materials of the invention, some of them are acceptable depending on the structure or kind of aglycon (portion of the glycoside other than sugar). For example, limonin and hesperetin can be present. Fishes and shellfishes are generally sensitive to alkaloids or glycosides having high toxicity, and many of them are much less tolerant to these substances unlike terrestrial animals.

Useful plant residues are mainly residues of citrus fruits (the family Rutaceae) separated from juices, fruit residues separated from expressed juices, coffee grounds, plant oil extraction residue, dregs of starch washings, dregs of grain washings, extraction residue of teas or the like (green tea, oolong tea, black tea, roasted tea, *Eucommis ulmoides* tea, persimmon leaf tea, gymnema tea, licorice tea, barley tea, unpolished rice tea, adlay tea, *Artemisia indica* tea, pu-er cha, banaba tea, barb tea, *Rubus suarvissinius* tea, lycium tea, houttuyniae tea, lotus leaf tea, ruibos tea, *Lindera strychnifolia* tea), residues separated from sugar extracts, vegetable residues separated from juices, fruit and vegetable wastes, wastes of treated seaweeds. These residues are usually discarded or incinerated, or have a very low value for use as a manure of cheap effect or feed extenders. The plant residues comprise cellulose, hemicellulose, pectin, tannin, a small amount of sugar, and a considerable amount of crude fibers, and are not serviceable as favorite food for fishes and shellfishes. The term "microorganically fermented product" refers to a product obtained by growing a useful bacterium, yeast, mold, basidiomycete or algae on such a plant residue under suitable conditions and converting the residue to a material containing useful proteins through a biochemical method.

Examples of bacteria useful for the present invention are lactic acid bacteria, propionic acid bacteria, acetic acid bacteria, and bacteria of the genera pseudomonas, Escherichia, Bacillus, Clostridium, Azotobacter, Azomonas, Rhizobium, Corynebacterium, Brevibacterium, Citromyces, etc.

Examples of useful yeasts are those of the genera Saccharomyces, Zygosaccharomyces, Kluyveromyces, Schizossaccharomyces, Hansenula, Pichia, Candida (including yeast of the Torula), Rhodotorula, etc.

Examples of useful molds, basidiomycetes or algae include streptomyces and molds of the genera Mucor, Phizopus, Aspergillus, Penicillium, Monascus and Neurospora, *Fungi imperfecti*, the species *Botrytis cinera*, the species *Trichoderma viride*, and the algae of *Aphanothece sacrum* and spirulina.

These bacteria, yeasts, basidiomycetes or algae are used singly or in a mixture.

Among these microorganisms, preferable for use in the present invention are lactic acid bacteria, acetic acid bacteria, bacteria of the genera Pseudomonas, Bacillus, Clostridium and Azotobacter yeasts of the genera Sccharomyces, Zygosaccharomyces, Hansenula, Candida and Rhodotorula, Streptomyces, molds of the genera Mucor, Rhizopus, Aspergillus, Penicillium, Monascus and Neurospora, and the species *Trichoderma viride*.

Among the microorganisms, photosynthetic microorganisms such as chlorella, spirulina and like algae generally have a strong cell wall and are therefore undesirable for use in baits as they are.

Generally, bacteria and yeasts are suited chiefly to the reactions in a liquid phase, while molds and basidiomycetes are suitable mainly for the reactions in a solid phase although the mode of reaction is not so strict. The optimum growth temperature is 30° to 40° C. for bacteria, 20° to 30° C. for yeasts or 25° to 35° C. for molds. In any of these cases, the growth requires culture medium components and water as will be described below.

The culture medium components required include sugars (such as glucose and carbohydrates), nitrogen-containing components (such as nitrogen-containing compound, yeast extract, and peptone or corn steep liquor), phosphoric acid salt, etc. The following aqueous solutions are used for bacteria, yeasts and molds. Useful for acetic acid bacteria is, for example, a mixture (5.4 in pH) of 20 g of glucose, 5 g of yeast extract, 5 g of peptone, 6 g of $KH_2PO_4$, 0.6 g of $MgSO_4 \cdot 7H_2O$, 0.3 g of $MnSO_4 \cdot 7H_2O$, 25 g of $CH_3COONa \cdot 3H_2O$, 1 ml of glacial acetic acid and 1000 ml of water. Generally used for yeasts is a mixture (7.0 in pH) of 30 g of glucose, 3 g of yeast extract, 5 g of peptone, 1 g of $NaNO_3$, 3 g of $KH_2PO_4$, 3 g of $K_2HPO_4$, 0.3 g of $MgSO_4 \cdot 7H_2O$ and 1000 ml of water. Generally used for molds is a mixture (7.0 in pH) of 10 g of glucose, 5 g of yeast extract, 5 g of peptone, 2 g of $KH_2PO_4$, 0.3 g of $MgSO_4 \cdot 7H_2O$ and 1000 ml of water. Glucose may of course be replaced by a reaction mixture of amylose or cellulose and yeast or enzyme, and the yeast extract or the peptone is replaced by $NH_4NO_3$, $(NH_4)_2SO_4$ or $(NH_2)_2CO$ in the case of necessity.

The plant residue is fermented by (a) adding a protein-assimilating microorganism directly to the residue for the formation of proteins, or (b) treating the residue as with a saccharifying enzyme, acid, alkali or chemical oxidant first and subsequently adding a protein-assimilating microorganism to the residue for the formation of proteins. Either one of these methods is selected depending on the kind of the material used. From the viewpoint of industrial production, bacteria, yeasts or molds are convenient microorganisms, and have the advantage of assuring highly efficient production as by the introduction of an enzymatic gene. The method (a) is preferred for citrus fruit residues separated from the juice and containing soluble carbohydrates and sugars remaining therein. The microorganically fermented product in the form of a crude product or as purified contains relatively hard cellulosic wall covering the yeast protein or the like as is usually the case with products prepared from plants, and is low in digestibility. To make the microorganically fermented product into the matrix material of a bait for fishes and shellfishes, it is desired to weaken the cellulosic wall by mechanical, physical, chemical or biochemical disintegration regardless of whether the product is, for example, in the form of a powder or paste because fishes and shellfishes generally have only small quantities of microorganisms, inclusive of carbohydrate digesting enzymes, within the digestive system. According to the present invention, however, the fermented product need not always be weakened but is usable, not only with all the wall completely disintegrated but also with the wall disintegrated partially. The wall is disintegrated by heating (baking), using a ball mill, explosive disintegration, irradiating with microwaves, dissolving with an alkali, or disintegrating with an enzyme or electrically. For heating, a suitable heating means is used for heating the residue usually at not lower than 100° C., preferably at about 120° to about 180° C. The ball mill to be used can be one of those already known. Explosive disintegration is a method resorting to explosion for rupturing the wall, and is well known, for example, for disintegrating grains of cereals or preparing feather meal. Alkali dissolving uses an alkali for partly removing the wall by dissolving. The alkali to be used is an alkaline substance which is capable of dissolving the wall and which is usually in the form of an aqueous solution. The enzyme to be used for disintegration is suitably selected from among those capable of dissolving the wall for removal. These methods of disintegration are used singly or in combination of at least two of them. The disintegrated product (partly or completely disintegrated product or baked product) serves as a base substance for the bait. The matrix material comprising the product is subjected to the subsequent step of admixing amino acids because the microorganically fermented product as it is encounters difficulty in stimulating the sense of taste of common fishes or shellfishes.

The matrix material consists only of the microorganically fermented product prepared from a plant residue and its disintegrated product, or comprises the disintegrated product and other ingredients admixed therewith. In any case, the matrix material consists primarily of a mixture of solid proteins of good quality and plant impurities attributable to the starting material, with a solid powder or the like intentionally added to the mixture when desired.

Incorporated into the matrix material are a lower amino acid (A) having 2 or 3 carbon atoms and a higher amino acid (B) having at least 4 carbon atoms in an A/B molar ratio of 1 to 40. The amino acids are incorporated into the matrix material basically by one of the methods stated below. Incidentally, the A/B ratio of 1 to 40 was determined by experiments as being acceptable to the olfactory sense of fishes and shellfishes. Unless flavored with the amino acid, the matrix material becomes less valuable for use in the bait. The basic methods are as follows.

(1) The amino acids (A) and (B) each in the form of a powder or paste are incorporated into the matrix material. At this time, the amino acids (A) and (B) are added individually or as mixed together.

(2) The amino acids (A) and (B) are each made into an aqueous solution, or mixed together and made into an aqueous solution. The individual solutions or the mixed solution is incorporated into the matrix material.

(3) An adhesive paste is further used in the methods (1) and (2) so that the amino acids can be adhered to the matrix material easily. This is especially suitable for the method (2). It is more preferable to add the adhesive paste to the aqueous mixture solution of amino acids (A) and (B) before the incorporation.

While a wide variety of adhesive pastes are usable for the method (3), natural adhesives are more desirable than synthtic adhesives. Examples of useful natural adhesives are molasses, starch, malt syrups, konjak powder (glucomannan), locust bean gum, tara gum, guar gum, salep mannan, yeast mannan, pullulan, carrageenan, chitosan, gelatin, etc. Examples of synthetic adhesive, on the other hand, are carboxymethylcellulose salts, polyvinyl alcohol, etc.

In the case where the bait for fishes and shellfishes is used in the form of pellets, the adhesives used in the method (3) serve as a binder. The mixture comprising the matrix material is then extruded from a nozzle, followed by cutting and drying, whereby dry pellets are prepared. In this process, the mixture is made into pellets as designed upon demand.

When the matrix material is in the form of a paste, the mixture prepared in the method (3) is admixed with the pasty matrix material, followed by extrusion through a nozzle, cutting and incomplete drying as the case may be. An oil, fat or emulsion can be added to the resulting mixture to obtain moist pellets.

When required, one or at least two other materials can be added to the matrix material before or after incorporating the amino acids thereinto. These other materials include extenders, mineral ingredients, fish meals, plant seed proteins, blood meal, feather meal, animal proteins, antiseptics, antioxidants, vitamins, lipids (especially unsaturated fatty acids) and enriching additives (carotenes, amino acid supplements or amino acid oligomers, etc.). The properties of amphoteric electrolytes such as amino acids and proteins can be evaluated conveniently with reference to the isoelectric point (pI) thereof, and the saturation solubility at pI is defined as the solubility. According to the present invention, amino acids (A) and (B) each having inherent pI are used in a specified ratio in combination to give a slightly altered point pI and arouse the olfactory sense of fishes and shellfishes. While hydrates of amino acids include those variously different in the structure, complex paired iron hydrate (a kind of clathrate compound) which differs in pI from the component amino acids is formed to produce a strong influence on the olfactory sense of fishes and shellfishes and further stimulate their gustatory sense with the same effect, thereby achieving an improved feeding effect. None of such effects of amino acids except for the effect to develop a "Umami(delicacy)" are known insofar as terrestrial animals are concerned.

Our basic research has revealed that the effect of amino acids on fishes and shellfishes differs depending on the configuration of the acid, i.e., whether it is l-form, d-form or d,l-form. Optically inactive lower amino acids (A) include glycine, taurine, sarcosine and β-alanine, and the first two acids exhibit a moderate attracting effect on fishes and shellfishes. Amino acids are generally in the order of l-form>d,l-form>d-form in palatability to fishes and shellfishes, and the compounds of d-form include those which appear usable as repellents for aquatic animals.

Unlike amino acids many of dipeptides, tripeptides, tetrapeptides and like oligomers of amino acids are sparingly soluble in water and fail to greatly arouse the olfactory sense of fishes and shellfishes. The microorganically fermented product has a component of resembling plant proteins (e.g., soybean protein) in amino acid compositions and, as a bait, tends to contain lesser quantities of leucine, glutamic acid, tyrosine, glycine, lysine, methionine, arginine and aspartic acid, so that derivatives or oligomers comprising these acids can be added to the bait as nutrient enriching agents even if such additives are irrelevant to the olfactory sense and gustatory sense.

Examples of higher amino acids (B) are mainly valine, leucine, isoleucine, betaine, threonine, aspartic acid, asparagine, glutamic acid, glutamine, lysine, histidine, arginine, phenylalanine, tyrosine, proline, tryptophan, cystine and methionine, a majority of which are essential amino acids. These acids are used singly or in mixture.

Examples of useful nonprotein amino acids are α-aminobutyric acid, γ-aminobutyric acid, ornithine, asterubine, canaline, canavanine, citrulline, dibromotyrosine, dihydroxyphenylalanine, djenkolic acid, homocystine, diiodotyrosine, isoglutamine, kynurenic acid, kynurenine, N-methylhydroxyproline, norvaline, norleucine, hydroxyproline, octopine, oxylysine, thyroxine, surinamine, ergothioneine, phosphoserine, methionine sulfoxide, methionine sulfone, methionine methylsulfonium salt, cysteinic acid, cystine disulfoxide, phenylglycine, isovaline, etc. These acids are often used in a small amount in combination with essential amino acids.

(A) and (B) are present in an A/B molar ratio of 1 to 40, which indicates that (A), having an effect to synergically assisting the effect of (B), needs to be present in an amount of at least one mole per mole of (B) which primarily serves as an olfactory substance for fishes and shellfishes. The methods of mixing (A) and (B) together and the methods of incorporating these acids are already described. A detailed description will be given of the preparation of such a mixture as an example according to the method (3) stated.

Into a 3-liter flask are placed 147.3 g (1 mole) of l-glutamic acid and 225.21 g (3 moles) of glycine, and water is placed in to prepare 1 liter of a mixture. When the mixture is boiled under a reflux condenser attached to the flask, the solids completely dissolve to afford a transparent solution. When the solution is cooled, crystals of glutamic acid, other hydrates, etc. separate out. Addition of a naturally occurring adhesive paste to prevent the separation gives a stabilized solution, which can be mixed with the matrix material at room temperature. If no adhesive paste is used for the composition, it will be necessary to adjust the A/B ratio to 4 to 5, preferably 5 to 10, and to dilute the solution.

However, difficulty is encountered in preparing a solution, for example, with use of l-tyrosine in place of the glutamic acid. It appears impossible to obtain a stabilized solution in this case unless the A/B ratio is adjusted to 10 to 40 and if the mixture is not diluted.

BEST MODE OF CARRYING OUT THE INVENTION

A typical mode of practicing the invention will be described next with reference to a case wherein use was made of the adhesive paste solution described above and containing a mixture of l-glutamic acid and glycine.

Grapefruit (*Citrus paradisi*) was washed and squeezed by an expression machine to obtain a juice and a cake in approximately equal amounts. The cake, (i.e., fruit residue), was mashed by a strong juice mixer and adjusted to pH 5.3 by adding milk of lime thereto. The resulting paste became easy to further press and therefore pressed again to obtain a liquid corresponding in quantity to about 20% of the original grapefruit. Concentration of the liquid in a vacuum gave citrus molasses having a sugar content of 37% and pH of 5.3.

A composition was prepared from 0.6 g/l of $NaHPO_4$, 0.4 g/l of $KH_2PO_2$, 0.2 g/l of $MgSO_4.7H_2O$, 16.7 mg/l of $FeCl_3.6H_2O$, 0.80 mg/l of $CuCl_2.2H_2O$, 0.18 mg/l of $ZnSO_4.6H_2O$, 0.15 mg/l of $MnSO_4.4H_2O$, 0.18 mg/l of $CoCl_2.6H_2O$, 15 g/l (combined amount although added in divided portions) of $(NH_4)_2SO_4$ and 7 g/l (combined amount although added in divided portions) of $(NH_2)_2CO$, and adjusted to pH 5.8 to obtain 1 liter of a culture medium. To the medium were added 600 g of the citrus molasses and 20 g of *Candida utilis*, followed by reaction at 30° C. for 60 hours while introducing air into the medium. After the reaction, the resulting precipitate was filtered off, washed with water and dried, giving 135 g of grapefruit yeast. Further drying and pulverization of the product gave a matrix material having a crude protein content of about 55%.

The above-mentioned adhesive paste solution (10 g) containing l-glutamic acid and glycine (1:3 in molar ratio) was applied to the matrix material, followed by thorough mixing in a mortar. A mixture was then prepared from 74 g of this mixture, 10 g of wheat gluten, 10 g of bonito oil (oil from *Katsuwonus pelamis*), 4 g of mineral mixture (comprising 40 parts of calcium hydrogen phosphate, 20 parts of calcium lactate, 20 parts of potassium bihydrogen phosphate, 10 parts of magnesium sulfate and 10 parts of iron citrate), 1 of vitamin mixture (comprising vitamin $B_1$, calcium ascorbate, choline, nicotinic acid, calcium pantothenate and riboflavin and 1 g of sodium alginate. With addition of a small amount of water, the mixture was kneaded, thereafter pelletized and dried at a low temperature to obtain moist pellets. The product was used for raising *Seriola quinqueradiata* in a fish preserve for 6 weeks starting early in July. The growth achieved was comparable to that of a group given a fresh bait. When ⅓ of the amount of the glycine was replaced by a mixture of l-α-alanine and l-proline in equal amounts, attraction ratio of the *Seriola quinqueradiata* is attained was 100%, and the *Seriola quinqueradiata* raised with use of the moist pelletized bait tasted much better than those of the group given the fresh bait and were found commercially superior.

The bait was checked for its effect by conducting experiments using natural seawater, artificial seawater, and fresh water for growing fishes and shellfishes. Generally a more reproducible result was obtained with artificial seawater than with natural seawater. The fishes and shellfishes raised in artificial water for a period of time were found easier to evaluate than those checked immediately after they were collected from the sea.

The microorganically fermented product prepared from the plant residue is useful as it is as a bait, whereas it is desirable to purify the product to obtain microorganism proteins and to assure a higher nutritive value. The fermented product is purified, for example, through treating the product with an alkali and extracting of the proteins to remove carbohydrates and salts. Isoelectrically precipitation of the extract with addition of an acid, and separating off, dewatering and drying the precipitate, followed by grinding in a ball mill to obtain a powder.

EXAMPLES

In connection with the present invention, we have conducted numerous experiments, from which several typical examples are extracted to illustrate the technical features of the invention as given below. Accordingly, the invention should not be construed as being limited only to the following examples but can of course be practiced in the form of desired alterations or modifications without departing from the features and spirit of the invention.

Example 1

Fruit of Unshiu orange (*Citrus aurantium*) was washed and pressed by an expression machine to obtain a liquid (mixture of juice and a small amount of d-limonene) and a residue in approximately equal amounts.

The residue contained about 80% of water and 0.5 to several % of d-limonene. When dried, the residue contained 15 to 20% of carbohydrates, 1.5 to 2.0% of crude fibers, about 0.2% of crude fats and about 1.0% of crude proteins, and was about 1.0% in total nitrogen content, 0.5 to 1.0% in ash content and 4.0 to 4.5 in pH. Since the residue contained pectic substances, milk of lime was added to the residue before drying for neutralization (5.0 to 5.5 in pH). The residue was stirred and pressed again, giving a liquid corresponding in amount to about 20% of the original fruit. The liquid was concentrated in a vacuum at 50° to 60° C. The concentrate was citrus molasses having a water content of 20 to 25%, a sugar content of 35 to 40%, a sucrose content of to 20%, a total nitrogen content of about 0.5 to 0.6%, an ash content of 0.2 to 1.0% and a pH of 5.0 to 5.5.

On the other hand, a nutrient solution was prepared from 3.2 g/l of 85% $H_3PO_4$, 1.2 g/l of KOH, 0.02 g/l of NaOH, 1.0 g/l of $MgSO_4.7H_2O$, 15 mg/l of $FeCl_3.6H_2O$, 0.1 mg/l of $CuSO_4.5H_2O$, 10.2 mg/l of K, 1.5 mg/l of $MnSO_4.H_2O$, 1.0 mg/l of $ZnSO_4.6H_2O$, 16 g/l (combined amount although added in divided portions) of $(NH_4)_2SO_4$ and 8 g/l (combined amount although added in divided portions) of $(NH_2)_2CO$, and adjusted to a pH of 5.5 to 6.6 for use as a culture composition. With 1.2 liters of the aqueous solution was admixed 200 g of the above citrus molasses to obtain a culture medium, to which 10 g of *Candida utilis* was added to effect fermentation at 25° to 35° C. for 48 hours with stirring while introducing air into the mixture. When the resulting reaction mixture was allowed to stand, a precipitate was formed, which was filtered off, washed with water and dried in a vacuum, affording about 50 g of citrus yeast (71% in yield). The product contained 4.5% of water, 50 to 60% of crude proteins, 0.5% of lipids and 19 to 20% of carbohydrates, had an ash content of 2.5% and was not inferior to fish meal, soybean oil cake and linseed squeezed cake in composition. However, the product itself was not appetizing to the olfactory sense of fishes and shellfishes and was unusable as a bait. The product was therefore flavored with amino acids and processed into baits in some of the examples to follow.

a vacuum within a desiccator. The tablets were bored centrally thereof so as to be holdable in suspension in a water tank with a stainless steel wire passed through each tablet. Fresh water or seawater (150 liters) was placed into plastic tanks, at least five fish or shellfish of the same kind and medium size which were raised in advance were placed into each tank, and the water was gently aerated and filtered in circulation. With relatively dim illumination provided, the tablet was quietly placed into the water at an end of the tank and held therein in suspension to observe the behavior of the fish or shellfish. When at least 60% of the total number of fish gathered around the tablet and started to display behavior resembling ingestion behavior within 60 minutes after the start of the experiment, the tablet was evaluated as attracting fish. As to the shellfish, the number of fish acting to exhibit exploratory behavior by stretching out the siphon or foot was counted for evaluation. Table 1 shows the result.

TABLE 1

| Ex. | Amino acid | Attractable fishies and shellfishes |
|---|---|---|
| 2 | Glycine | *Astroconger myriaster, Stephanolepis cirrhifer, Chrysophrys major, Parapristipoma trilineatum, Seriola quinqueradiata, Oryzias latipes, Penaeus juponicus, Octopus vulgaris* |
| 3 | l-α-Alanine | *Astroconger myriaster, Anguilla Japonica, Stephanolepis, cirrhifer, Seriola quinqueradiata, Sulculus diversicolor, Cyprinus carpio* |
| 4 | l-Valine | *Chrysophrys major, Tapes Philippinarum, Oryzias latipes* |
| 5 | l-Leucine | *Chrysophrys major, Salmo gairdneri, Corbicula japonica* |
| 6 | l-Isoleucine | *Chrysophrys major, Crassius aurantis, Cyprinus carpio, Parasilurus asotus* |
| 7 | l-Methionine | *Seriola quinqueradiata, Acanthogobius flavimanus, Parasilurus asotus* |
| 8 | l-Glutamine | *Nordotis discus, Partunus trituberculatus* |
| 9 | l-Arginine | *Chrysophrys major, Babylonia japonica, Nordotis discus* |
| 10 | l-Tyrosine | *Chrysophrys major, Salmo gairdneri* |
| 11 | l-Proline | *Sebastiscus mamoratus, Chrysophrys major,* |
| 12 | l-Histidine | *Fugu rubripes, Tapes philippinarum, Babylonia japonica, Nordotis gigantea* |
| 13 | l-Glutamic acid | *Aeanthopagrus schlegeli, Hemiramphus sajori, Seriola quinqueradiata* |
| 14 | l-phenylalanine | *Nordotis discus, Sulculus diversicolor, Tapes philippinarum, Palaemon pacificus* |
| 15 | l-Betaine | *Paralichthys olivaceus, Parapristipoma trilineatum, Fugu pardalis, Anguilla japonica* |
| 16 | l-Tryptophan | *Trachurus trachurus, Chrysophrys major, Salmo gairdneri* |
| 17 | l-Lysine | *Seriola quinqueradiata, Salmo gairdneri, Carassius aurantus* |

Examples 2–17

The citrus yeast (50 g) obtained in Example 1 was placed into a small ball mill and thoroughly ground to obtain a matrix material. A 6 g quantity of 0.5% aqueous starch solution containing 0.1 mole of the amino acid listed in Table 1 dissolved or dispersed therein was added to the material. The mixture was kneaded in a mortar and made into tablets, each weighing 0.5 g, by a tableting machine. The tablets were dried at room temperature and preserved in Examples 18–28

To prepare a bait more effective than those prepared in Examples 2 to 17, the lower amino acid (A) and the higher amino acid (B) shown in Table 2 were mixed together in the molar ratio listed, and the mixture was dissolved or dispersed in 1% aqueous solution of pullulan (α-1, 4'-; α-1, 6'-glucan). To 3 ml of the resulting solution or dispersion was added 50 of the citrus yeast (matrix) obtained in Example 1, and the mixture was kneaded, and tableted and tested in the same manner as in Examples 2 to 17. Table 2 shows the results. In Table 2, *seriola quinqueradiata* is about 30 cm in length.

TABLE 2

| Ex. | A (mole) | B (mole) | Attractable fishies and shellfishes | Attraction ratio (%) |
|---|---|---|---|---|
| 18 | Glycine (0.1) | l-Glutamic acid (0.1) | Chrysophrys major, Seriola quinqueradiata, Carassius auranatis | At least 65 |
| 19 | Glycine (0.3) | l-Glutamic acid (0.1) | Chrysophrys major, Seriola quinqueradiata, Acanthopagrus schlegeli | At least 70 |
| 20 | Glycine (0.6) | l-Glutamic acid (0.1) | Chrysophrys major, Seriola quinqueradiata, Acanthopagrus schlegeli | At least 80 |
| 21 | Glycine (0.8) | l-Glutamic acid (0.1) | Chrysophrys major, Seriola quinqueradiata, Acanthopagrus schlegeli | At least 90 |
| 22 | Glycine (1.0) | l-Glutamic acid (0.1) | Chrysophrys major, Seriola quinqueradiata, Acanthopagrus schlegeli, Girella punctata | At least 95 |
| 23 | l-α-alanine (0.5) | l-Glutamic acid (0.1) | Seriola quinqueradiata, Anguilla japonica, Micropterus Salmoides | At least 70 |
| 24 | l-α-alanine (1.0) | l-Glutamic acid (0.1) | Seriola quinqueradiata, Anguilla japonica, Micropterus Salmoides | At least 80 |
| 25 | Taurine (0.1) | l-lysine (0.1) | Seriola quinqueradiata, Oplegnathus fasciatus | At least 70 |
| 26 | Taurine (0.2) | l-lysine (0.1) | Seriola quinqueradiata, Oplegnathus fasciatus | At least 75 |
| 27 | Taurine (0.5) | l-lysine (0.1) | Seriola quinqueradiata, Oplegnathus fasciatus, Acanthopagrus schlegeli | At least 80 |
| 28 | Taurine (1.0) | l-lysine (0.1) | Seriola quinqueradiata, Oplegnathus fasciatus, Acanthopagrus schlegeli | At least 90 |

Examples 29

The residue (250 g) of squeezed Unshiu orange (*Citrus aurantium*) obtained in Example 1 and 100 g of water were thoroughly treated in a juice mixer to prepare a paste. Since the paste contained an oil-soluble component, the paste was extracted with ether to remove limonene and other terpenes and flavones. The resulting paste was dried in a vacuum and pulverized to a powder. The powder was placed into a glass tube, one end of the tube was connected to a glass ampule containing 50 g of nitric acid anhydride, and the assembly was preserved in a cold dark room for 1 week while allowing the powder to be exposed under normal pressure to $NO_2$ gas spontaneously produced. The oxidized powder obtained became completely soluble in a dilute aqueous solution of sodium hydroxide. The oxidized powder was mixed with 1000 ml of an aqueous solution of the same medium composition as described in Example 1, the mixture was adjusted to pH 5.5 to 5.6, and 10 g of *Candida utilis* was added thereto, followed by stirring for reaction at 20° to 30° C. for 50 hours while introducing air into the mixture. The reaction mixture was filtered off, washed with water, dried and pulverized, giving about 40 g of a citrus yeast (comprising 4.7% of water, 59% of crude protein, 0.6% of lipids and 17% of carbohydrates and having an ash content of 5.3%). The method described converted a considerably great proportion of the solids of the citrus residue into a matrix material. However, the material itself fails to stimulate the olfactory sense of fishes and shellfishes and is therefore to be flavored with amino acids as in Examples 8 to 28 and improved in its effect to attract and feed fishes.

Examples 30–38

One mole of l-glutamic acid and 3 moles of glycine were dissolved in 1 liter of hot water, and the solution was stabilized with addition of glucomannan serving as an adhesives of the natural polysaccharide type. The thickened amino acid solution (10 g) was sprayed onto 50 g of a matrix material comprising a microorganically fermented product as disintegrated and prepared from each of the plant residues listed in Table 3, followed by drying and then by pulverization to obtain a bait powder for polyphagous freshwater fishes. The matrix material was prepared by placing 100 g of the starting material dry powder listed in Table 3 into a glass tube, chemically oxidizing the powder partially in the same manner as in Example 29 and fermenting the oxidized powder according to the method of Example 1 using the yeast shown in Table 3.

TABLE 3

| Ex. | Starting material | Yeast | Use of fermented product |
|---|---|---|---|
| 30 | Coffee grounds | Trichoderma viride | Bait for Cyprinus carpio and Carassius auratus |
| 31 | Green tea residue | Aspergillus niger | Bait for Tilapia nilotica |
| 32 | Oolong tea residue | Fusarium moniliforme | Bait for Tilapia nilotica |
| 33 | Barley water residue | Hansenula anomala | Bait for Carassius auratus (goldfish) |
| 34 | Guttapercha leaf residue | Candida tropicalis | Bait for Microterus Salmodes |
| 35 | Roasted tea residue | Candida rugosa | Bait for Carassius auratus (goldfish) |
| 36 | Black tea residue | Candida utilis | Bait for Cyprinus carpio and Carassius auratus |
| 37 | squeezed Carrot residue | Candida utilis | Bait for Anguilla japonica |
| 38 | squeezed Tomato residue | Candida utilis | Bait for Anguilla japonica |

Example 39

When the fruit of Valencia orange (*Citrus sinensis*) was washed and squeezed by an expression machine, a liquid (mixture of juice and a small amount of d-limonene) and a residue were obtained in approximately equal amounts.

The residue contained about 80% of water and about 0.7 to about 1.2% of d-limonene. When dried, the residue contained 14 to 0.8% of carbohydrates, 2.2 to 2.5% of crude fibers, about 0.2% of crude fats and about 1.0% of crude proteins, and was about 1.0% in total nitrogen content, 0.8% in ash content and 3.7 in pH. After the residue was neutralized with 0.6% of milk of lime, kneaded and then allowed to stand for 30 minutes, water separated off, so that the residue was pressed again, giving a liquid in an amount of about 25% of the original fruit material. Concentration of the liquid in a vacuum afforded about 40% of citrus molasses.

With 1 liter of the solution of medium composition of Example 1 was mixed 200 g of the citrus molasses, 8 g of domesticated citrus yeast was added to the mixture, followed by fermentation for 60 hours while introducing air into the mixture. The resulting precipitate was filtered off, dried and pulverized to give about 60 g of a matrix material comprising a Valencia yeast. The material contained about 60% of crude proteins, was comparable to fish meals as a bait material but somewhat deficient in some components, i.e., in lysine, methionine and vitamins, as compared with fish meals and was therefore enriched by adding supplements. The enriched bait was further flavored and thereby made fully palatable to fishes and shellfishes. The most common flavor is an aqueous adhesive paste composition comprising 3 moles of l-α-alanine, 1 mole of glycine and 1 mole of l-glutamic acid (with gelatin serving as the adhesives). This paste composition was added in an amount of 3% to the Valencia yeast, and the mixture was thoroughly mashed by a mixer, followed by tableting and then by drying.

For use as a bait for young fishes and fry fishes, the mashed mixture is passed through a sieve of suitable mesh size.

The bait can be used for culturing common fishes in place of fish meals or soybean residual cake. When lipids are required for giving an improved nutritive value, lecithin, linolenic acid, eicosapentaenoic acid (EPA), docosahexaenoic acid (DHA) and the like may be added to the mashed mixture singly or as a mixture of at least two of them in a combined amount of 1 to 5%.

Presence of such lipids produces a favorable result especially in raising young fishes or fry fishes.

Example 40

Three kinds of fruits, i.e., grapefruit (*Citrus paradisi*), Watson pomelo, (*Citrus Natsudaidai*) and mandarin orange (*Citrus reticulata*), of small size for collecting juice were mixed together in equal quantities and washed with water. The residue (100 g) obtained by squeezing the mixture by an expression machine and 100 g of water were fully mashed in a mixer to prepare a paste. The paste was washed with ether to remove d-limonene, other terpenes and oily substances. Next, 1 ml of 10% aqueous solution of hydrogen peroxide was added to the paste, the mixture was mixed with 100 g of water again, and the resulting mixture was thoroughly agitated in the juice mixer. To the mixture was added 1 liter of a culture medium [comprising 0.6 g/l of NaHPO$_4$, 0.4 g/l of KH$_2$PO$_2$, 0.2 g/l of MgSO$_4$.7H$_2$O, 16.7 mg/l of FeCl$_3$.6H$_2$O, 0.66 mg/l of CuCl$_4$.2H$_2$O, 0.18 mg/l of ZnSO$_4$.6H$_2$O, 0.66 mg/l of CuSO$_4$.5H$_2$O, 0.15 mg/l of MnSO$_4$.4H$_2$O, 0.18 mg/l of CoCl$_2$.6H$_2$O, 15 g/l (combined amount although added in divided portions) of (NH$_4$)$_2$SO$_4$ and 7 g/l (combined amount although added in divided portions) of (NH$_2$)$_2$CO, and adjusted to a pH of 5.5 to 6.0]. To this mixture was added 10 g of domesticated Valencia yeast, followed by reaction at 25° to 30° C. for 50 hours while introducing air containing 2% of oxygen into the mixture. After the reaction, the resulting precipitate was filtered off, washed with water, dried and pulverized, giving a useful yeast (crude proteins 61%) in a yield of about 70%. Onto this yeast matrix was sprayed 5 to 6 ml of a mixture comprising 0.2 mole of l-α-alanine, 0.2 mole of taurine, 0.05 mole of l-glutamic acid, 0.05 mole of l-aspartic acid and 0.05 mole of l-lysine, followed by thorough mixing and molding. Pulverization of the molded product afforded a bait for tropical aquarium fishes.

Example 41

A fish meal or soybean oil squeezing cake was admixed with the matrix of Example 40 in conformity with the use thereof. However, when the mixture comprised at least 30% of the soybean oil cake and was used for *Seriola quinqueradiata*, the mixture was digested less efficiently resulting in a tendency toward somewhat retarded growth. On the other hand, the presence of fish meal in whatever amount entailed satisfactory growth. While baits comprising such a matrix were tested in the form of dry pellets, soft dry pellets or moist pellets on young yellowtails, it was in any case necessary to give careful consideration to the balance of essential amino acids and to reduce the carbohydrate content. Use of the present matrix material made it possible to decrease the amount of fish meal conventionally used to approximately one-half or smaller. Onto the yeast matrix of Example 4 was sprayed 10 to 11 ml of guar gum aqueous solution containing 0.2 mole of l-α-alanine, 0.2 mole of taurine, 0.2 mole of d, l-methionine, 0.2 mole of l-lysine and 0.3 mole of glycine, and the mixture was thoroughly stirred, then molded and thereafter made into wobbler pellets or crumble pellets. *Seriola quinqueradiata* were feedable on the pelletized bait with a greatly improved efficiency.

Example 42

A dry cake (comprising 15 to 20% of carbohydrates, 1.5 to 2.0% of crude fibers, about 0.2% of crude fats and about 0.% of crude proteins and having a total nitrogen content of about 1.0%, an ash content of 0.5 to 1.0% and a pH of 4.0 to 4.5) obtained by expressing fruit of *Citrus aurantium* was milled into grains of 1 to 2 mm in size. With the granular material was admixed 500 ml of water (containing 1 g of KH$_2$PO$_4$ and 3 g of NH$_4$NO$_3$), and the mixture was thereafter maintained at 120° C. for 20 minutes for thermal sterilization and cooled to 30°C. With addition of 10 of *Aspergillus oryzae*, the mixture was thereafter fermented at 25° to 30° C. for 70 to 80 hours while stirring the mixture from time to time for aeration. The resulting mixture was dried and pulverized, affording about 600 g of a powder. The product was a pale brown to brown powder smelling like brewer's yeast, containing 20 to 30% of water, 30 to 45% of crude proteins, 0.5 to 1% of lipids and 15 to 20% of carbohydrates and having an ash content of 3 to 5%. The powder was flavored with amino acids, i.e., with an aqueous solution of pullulan containing 0.6 mole of glycine and 0.1 mole of l-glutamic acid, by the method shown in Example 20. The product achieved an attraction ratio of 70 to 80% for *Chrysophrys major*, *Seriola quinqueradiata* and *Acanthopagrus schlegeli*.

Example 43

A reaction can be conducted also in a liquid phase using the aspergillus of Example 42. A 200 g quantity of sugar molasses at least 50% in sugar content or citrus molasses was mixed with 1.2 liters of a culture medium, the mixture was placed into a 5-liter jar fermenter, and 10 g of *Aspergillus oryzae* was added to carry out a reaction at 30° C. for 72 hours while passing air at 1 vvm through the mixture with gentle stirring. The culture medium used was composed of 12.0 g of $CH_3COONa \cdot 3H_2O$, 7.0 g of $CH_3COONH_4$, 1.0 g of $K_2HPO_4$, 1.0 g of $MgSO_4 \cdot 7H_2O$, 0.1 g of $FeSO_4 \cdot 7H_2O$ and 1.0 g of corn steep liquor as dissolved in 1 liter of water and had a pH of 6.0 (1 to 2% in acetic acid concentration). Unlike bacteria and yeasts, molds generally proliferate by growing hyphae and forming sporangia or conidia at their tips, so that it is desired to conduct the reaction for a prolonged period of time with gentle aeration and stirring while exercising caution so as not to damage the stalks. After the completion of culture, the suspended solids were filtered off, washed with water and dried, giving about 60 g of a mold crop (about 80% in yield). The product contained 5% of water, 50 to 60% of crude proteins 5% of lipids and 18 to 20% of carbohydrates with an ash content of 5%, and was in the form of a yellowish brown powder having a slight smell. When flavored with amino acids in the same manner as in Example 42, the product afforded a useful bait for seawater fishes.

Examples 45–50

The same procedure as in Example 42 was repeated using 10 g the microorganisms listed in Table 4 in place of *Aspergillus oryzae*, whereby the products of Table 4 were obtained. However, the reaction was conducted at a temperature of 27 to 30° C.

Example 51

When the procedure of Example 42 was performed with the reaction time altered to 35 hours, a brown powder was obtained which contained 28% of water, 30% of crude proteins, 0.2% of lipids and 33% of carbohydrates with an ash content of 4%. The product was low in crude protein content and unsuited to use for seawater fishes, whereas when suitably flavored, the product was usable as a bait for raising plant-eating or polyphagous fishes of the family Cyprinidae.

Stated more specifically, onto 100 g of the brown powder obtained was sprayed 10 g of an amino acid aqueous solution (prepared by dissolving 0.01 mole of l-isoleucine, 0.01 mole of l-glutamic acid and 0.3 mole of glycine in 1 liter of water and adding a starch paste to the solution), and the mixture was thoroughly stirred. The resulting mixture was extruded from a nozzle in the form of a slender stick, cut, dried at 120° C., lightly pounded in a mortar and made into crumble pellets. The bait thus prepared was found useful for crucian carp (*Carassius vulgaris*), carp (*Cyprinus carpio*) and goldfish (*Carassius auratus*).

Industrial Applcability

The present invention provides a bait for fishes and shellfishes which is characterized in that the bait comprises a matrix material containing a microorganically fermented product of a plant residue resulting from expression of a juice or its disintegrated product, the matrix material having incorporated therein a lower amino acid (A) having 2 or 3 carbon atoms and a higher amino acid (B) having at least 4 carbon atoms in an A/B molar ratio of 1 to 40. The specified amino acid present in the product of the invention dissolves out into water to stimulate the olfactory sense of fishes and shellfishes and therefore the gustatory sense thereof to achieve an improved feeding efficiency.

The product of the invention can be readily made free from bacteria, viruses and toxicity by a heat treatment and other procedures during the production process, prevents diseases frequently affecting fishes and shellfishes at present, obviates impeded growth, assures effective culture, making it possible to commercially supply tasty fish and shellfish of good quality in increased quantities. Accordingly, the product of the invention is provided for the field of fishery as a new material substituting for fish meals and soybean squeezed cake, and will prove of great benefit to fisheries.

We claim:

1. A bait for fishes and shellfishes characterized in that the bait comprises a matrix material containing a microorganically fermented product of a plant residue obtained by separating from a plant at least one liquid selected from the group consisting of vegetable juice, fruit juice, plant essential oil, juice extracted from a processed plant product, plant milk and mixtures thereof, or disintegrated product of said microorganically fermented product, wherein the matrix material has incorporated therein (A) an amino acid having 2 or 3 carbon atoms, and (B) amino acid having at least 4 carbon atoms in an (A)/(B) molar ratio of 1:1 to 40:1.

TABLE 4

| Ex. | Microorganism | Product | Water (%) | Crude protein (%) | Lipid (%) | Carbohydrate (%) | Ash (%) |
|---|---|---|---|---|---|---|---|
| 44 | *Saccharomyces cerevisiae* | Brown powder | 22 | 44 | 0.6 | 18 | 5 |
| 45 | *Rhizopus nigricans* | Brown powder | 30 | 45 | 0.6 | 15 | 6 |
| 46 | *Aspergillus niger* | Brown powder | 25 | 46 | 0.8 | 16 | 5 |
| 47 | *Hansenula anomala* | Light brown powder | 28 | 41 | 0.4 | 17 | 5 |
| 48 | *Bacillus brevis* | Yellowish brown powder | 27 | 42 | 0.3 | 18 | 4 |
| 49 | *Acetobacter aceti* | Light brown powder | 26 | 40 | 0.5 | 20 | 3 |
| 50 | *Lactobacillus bulgaricus* | Brown powder | 23 | 41 | 0.5 | 19 | 4 |

2. The bait for fishes and shellfishes as defined in claim 1, wherein the plant residue is substantially free from alkaloids other than methylated purine derivatives, and toxic glycosides.

3. The bait for fishes and shellfishes as defined in claim 1, wherein (A) is at least one amino acid selected from the group consisting of glycine, α-alanine, β-alanine, sarcosine, serine, cysteine and taurine.

4. The bait for fishes and shellfishes as defined in claim 1, wherein (B) is at least one amino acid selected from the group consisting of essential amino acids and nonprotein amino acids.

* * * * *